(12) United States Patent
Shikata et al.

(10) Patent No.: US 6,418,254 B1
(45) Date of Patent: Jul. 9, 2002

(54) FIBER-OPTIC DISPLAY

(75) Inventors: Masaichi Shikata; Yasuo Nakajima, both of Hyogo (JP)

(73) Assignee: Shizuki Electric Company, Inc., Nishinomiya (JP)

( * ) Notice: Subject to any disclaimer, the term of this patent is extended or adjusted under 35 U.S.C. 154(b) by 122 days.

(21) Appl. No.: 09/587,357

(22) Filed: Jun. 5, 2000

Related U.S. Application Data

(60) Provisional application No. 60/152,546, filed on Sep. 3, 1999, and provisional application No. 60/137,812, filed on Jun. 4, 1999.

(51) Int. Cl.$^7$ .................................................. G02B 6/06
(52) U.S. Cl. ........................ 385/116; 385/115; 385/120; 385/901
(58) Field of Search .............................. 385/115, 116, 385/119, 120, 121, 128, 901

(56) References Cited

U.S. PATENT DOCUMENTS

| | | | | |
|---|---|---|---|---|
| 2,825,260 A | * | 3/1958 | O'Brien ................ | 385/116 X |
| 2,985,784 A | | 5/1961 | MacNeille .............. | 385/120 X |
| 3,397,022 A | * | 8/1968 | Cole ....................... | 385/116 X |
| 3,769,509 A | | 10/1973 | Matone et al. ........... | 385/116 X |
| 3,909,109 A | | 9/1975 | Aurenz .................... | 385/116 X |
| 4,279,089 A | | 7/1981 | Murakami ................ | 40/547 |
| 4,601,537 A | | 7/1986 | Saccocio ................. | 383/116 X |
| 4,761,062 A | * | 8/1988 | Loce et al. .............. | 385/116 X |
| 4,871,228 A | * | 10/1989 | Roos ....................... | 385/116 X |
| 4,917,448 A | | 4/1990 | Oppenheimer .......... | 385/901 X |
| 5,049,176 A | | 9/1991 | Cook et al. ............. | 385/116 X |
| 5,127,078 A | | 6/1992 | Terry et al. ............. | 385/116 X |
| 5,150,445 A | | 9/1992 | Toyoda et al. .......... | 385/116 X |
| 5,293,437 A | | 3/1994 | Nixon ..................... | 385/116 X |
| 5,384,882 A | | 1/1995 | Shimamune et al. ... | 385/116 X |
| 5,596,671 A | * | 1/1997 | Rockwell, III .............. | 385/147 |
| 5,625,736 A | * | 4/1997 | Veligdan ...................... | 385/120 |
| 5,633,972 A | * | 5/1997 | Walt et al. .................. | 385/116 |
| 5,684,905 A | * | 11/1997 | Sugawara et al. .......... | 385/120 |
| 5,815,624 A | | 9/1998 | Rosenberg ................... | 385/115 |
| 5,832,168 A | | 11/1998 | Yenter ......................... | 385/147 |

FOREIGN PATENT DOCUMENTS

| | | | |
|---|---|---|---|
| DE | 3911-543 C1 | 8/1990 | ............. 385/116 X |
| GB | 2148570 A | 5/1985 | ............. 385/116 X |
| JP | 55-67707 A | 5/1980 | ............. 385/147 X |
| JP | 58-140704 A | 8/1983 | ............. 385/147 X |
| JP | 59-22007 A | 2/1984 | ............. 385/147 X |
| JP | 1-217304 A | 8/1989 | ............. 385/116 X |
| WO | WO 91/15785 | 4/1991 | ............. 385/116 X |

* cited by examiner

*Primary Examiner*—Brian Healy
(74) *Attorney, Agent, or Firm*—Merchant & Gould P.C.

(57) ABSTRACT

Disclosed are several embodiments of devices for improving the performance of optical fiber displays. A light-absorbing material is used to reduce reflected light and glare from the surface of an optical display that uses a diffusion sheet or sheets to increase the viewing angle of the display. A surface of each diffusion sheet is covered by the light-absorbing material except in those locations where there is an optical fiber or other light source. Further, the invention uses diamond and triangle shaped sheets to increase the tolerance in applying the diffusion sheets and reduce the non-uniformities such as air trapped between the sheets and the surface, partially covered optical fibers, overlapping diffusion sheets. A preferred embodiment also improves the performance of the optical fibers by coating them with a light-absorbing material to reduce crosstalk and interference between fibers and alternately by coating them with a reflective material which reduces both transmission losses and crosstalk between fibers. Further, fiber performance is improved using a by holding the ends of the fibers straight for a specified distance from each of their ends.

18 Claims, 6 Drawing Sheets

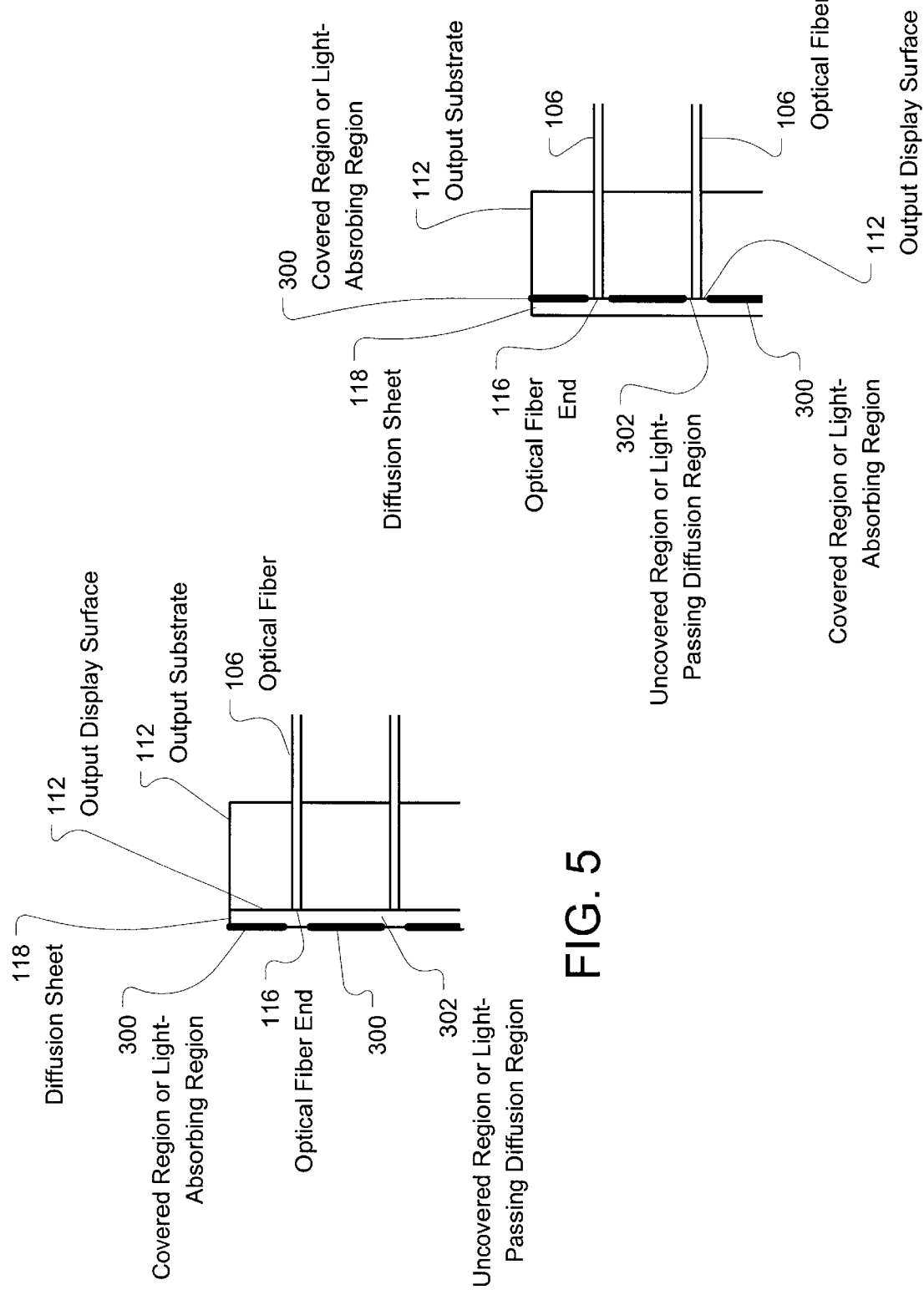

FIBER-OPTIC DISPLAY

RELATED APPLICATIONS

This application claims the benefit of provisional application Serial No. 60/137,812 filed Jun. 4, 1999 and provisional application Serial No. 60/152,546, filed Sep. 3, 1999.

FIELD OF THE INVENTION

This application relates generally to methods and devices for displaying images and more particularly to fiber-optic display devices.

BACKGROUND OF THE INVENTION

Optical fiber display devices are commonly used to display large images or in the type of situation remote viewing is required. Fiber-optic displays can receive an image from a source device, such as an image projector, and subsequently redisplay the image on an output screen by means of optical fibers.

Optical fibers, also known as light guides, are long, thin threads of fused silica or other transparent material that transmit light projected onto one end of the fiber to the other end of the fiber. Optical fibers are typically flexible and have a circular cross-section and a cylindrical surface connecting the two ends. In a fiber-optic display, a multitude of optical fibers is collected into a bundle. The bundle has an input surface where one end of each optical fiber is held in place, typically by a plastic or composite substrate, so that they form a generally planar surface. Likewise, the bundle has an output surface where the other end of each optical fiber is held in place to form another surface. Each fiber has a specific position relative to the others at both surfaces so that an image projected on the input surface is transmitted to and redisplayed at the output surface. Typically, the fibers are held close together at the input surface and are spaced father apart on the output surface, which has the effect of enlarging the displayed image relative to the source image.

A number of factors may degrade the quality of an image displayed by a typical fiber-optic display. For instance, ambient light may reflect from the substrate that holds the optical fibers at the output surface. The reflected light, referred to as glare, degrades the quality of the displayed image by reducing the contrast of the displayed image and otherwise interfering with the viewing of the displayed image.

The problem of glare may be exacerbated by the use of diffusion layers that increase the viewing angle of fiber-optic displays. Optical fibers emit light in a very tight beam, which results in a limited viewing angle that is restricted to the viewing angle of the raw fiber-optic element. Viewers outside of the limited viewing angle of the raw fiber-optic element only see the output surface of the bundle and do not see the displayed image. A typical solution to the viewing angle problem is to disperse the emitted light by the addition of a uniform diffusion layer, alternately referred to a dispersion layer, on the output surface. This layer typically consists of a thin sheet of material, referred to as a diffusion sheet, that uniformly refracts or otherwise disperses the light emitted from the output surface of the bundle and thus widens the viewing angle. However, the addition of the diffusion layer may increase the detrimental effect of glare on the image quality by diffusing the reflected glare as well as the light emitted from the optical fibers.

Additionally, the inclusion of a diffusion layer may introduce additional problems in large fiber-optic displays. In large applications, the diffusion layer may be made of multiple, smaller diffusion sheets because a single, large diffusion sheet can be difficult to apply uniformly. Any non-uniformities in the diffusion layer, either due to entrapped air between the diffusion sheet and the output surface, or creases in the diffusion sheet, adversely affect the viewing quality of the image by causing non-uniform dispersion of light emitted by the optical fibers. However, when multiple diffusion sheets are used, the joints between sheets can be another source of non-uniformities in the diffusion layer. The non-uniformities can be due to the overlapping of the diffusion sheets at the joints or enlarged gaps between diffusion sheets, which cause light emitted from some optical fibers to be dispersed more or less than the light from other optical fibers. In addition, gaps between the diffusion sheets may be more evident because of the direct and undispersed glare from the exposed substrate.

Another problem with optical fiber displays is due to the loss of a portion of the light projected upon an end of an optical fiber from the surface of the optical fiber during the transmission of the projected light to the other end. Transmission loss is a function of the length and optical characteristics of the optical fiber and reduces the contrast and brightness of the displayed image. In addition, the transmission losses from one fiber can subsequently penetrate an adjacent fiber in the bundle, a phenomenon referred to as crosstalk, which also degrades the final quality of the displayed image.

SUMMARY OF THE INVENTION

The present invention overcomes the disadvantages and limitations of the prior art by providing various embodiments that increase the quality of images displayed by fiber-optic displays. In one embodiment, diffusion sheets have been developed that contain one or more light-passing and light-absorbing regions. These regions are created by selectively covering regions on a surface of the diffusion sheets with a light-absorbing material, such as black paint. Light can pass through the uncovered regions of the diffusion sheets but not through the covered regions. The light-absorbing material can be located on either surface of the sheet, or may, in some cases, even be incorporated within the diffusion sheet. In the preferred embodiment, the covered regions are located on the surface of the diffusion sheets that is opposite the output surface of the substrate. The covered regions prevent glare from the substrate and diffusion layer by absorbing ambient light that would otherwise enter the diffusion layer and be reflected from the substrate. The uncovered regions of the sheets are located between the covered regions and are aligned with the optical fiber ends so that light emitted from the fibers is not covered or absorbed by the light-absorbing material and is transmitted through the diffusion sheet.

For applications requiring multiple sheets, the sheets are made in a diamond- or triangle-shaped configuration which allows their application to the substrate surface with an increased margin for error in positioning of the sheets when compared to rectangular sheets. It has also been determined than the diamond and triangle shapes are less likely to entrap air between the sheets and the substrate during application than a rectangular shape of the same area. Furthermore, because there are greater tolerances in placing the sheets on the substrate, the sheets may be applied to the substrate without overlap and with a small gap between adjacent sheets. This greater degree of tolerance also prevents fiber optic elements from being partially covered. The surface of the substrate between the gaps can also be treated to reduce the amount of light reflected from the exposed substrate.

The performance of optical fiber bundles has been improved by coating the surface of the individual fibers except for the ends with a reflective material, preferably silver colored, to prevent escape of light from the fibers. In an alternative embodiment, a light-absorbing material, preferably a black-colored adhesive, is applied to the surface of the fibers, except at the ends, to prevent crosstalk interference.

Another aspect of the invention is the development of a substrate that prevents bending losses by holding the fibers parallel within the substrate for a calculated minimum distance from the ends of the fibers. In the preferred embodiment the fibers are held parallel for a distance of at least, approximately, 100 times that of the diameter of the fibers.

These and various other features as well as advantages which characterize the present invention will be apparent from a reading of the following detailed description and a review of the associated drawings.

BRIEF DESCRIPTION OF THE DRAWINGS

FIG. 5 is a side view of the output surface showing the light-absorbing and light-diffusing regions in accordance with a preferred embodiment of the present invention.

FIG. 6 is a side view of the output surface showing the light-absorbing and light-diffusing regions in accordance with another preferred embodiment of the present invention.

DETAILED DESCRIPTION

Figure 1:
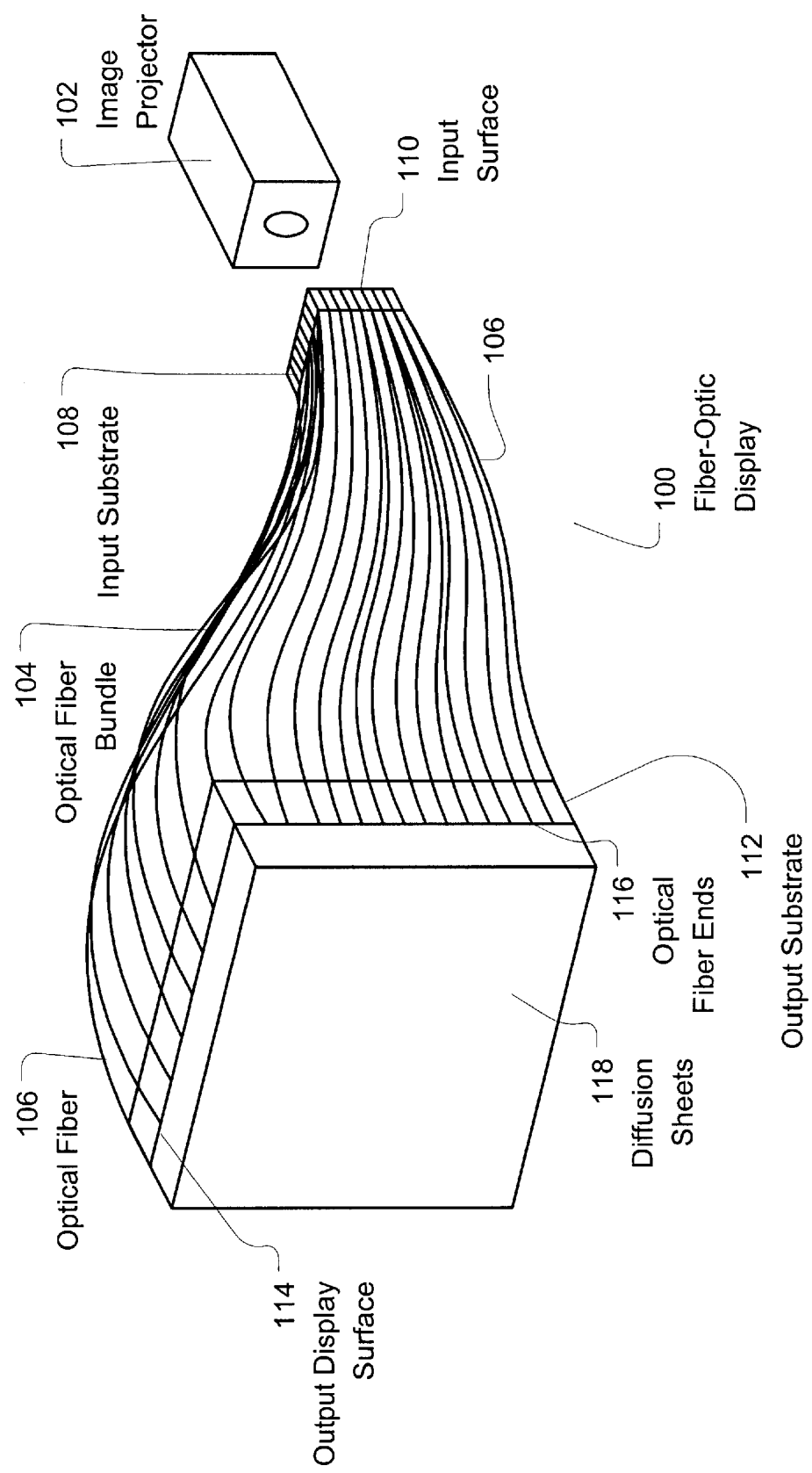
FIG. 1 is an oblique view of a fiber-optic display showing the primary components and incorporating a preferred embodiment of the present invention.
Figure 2:
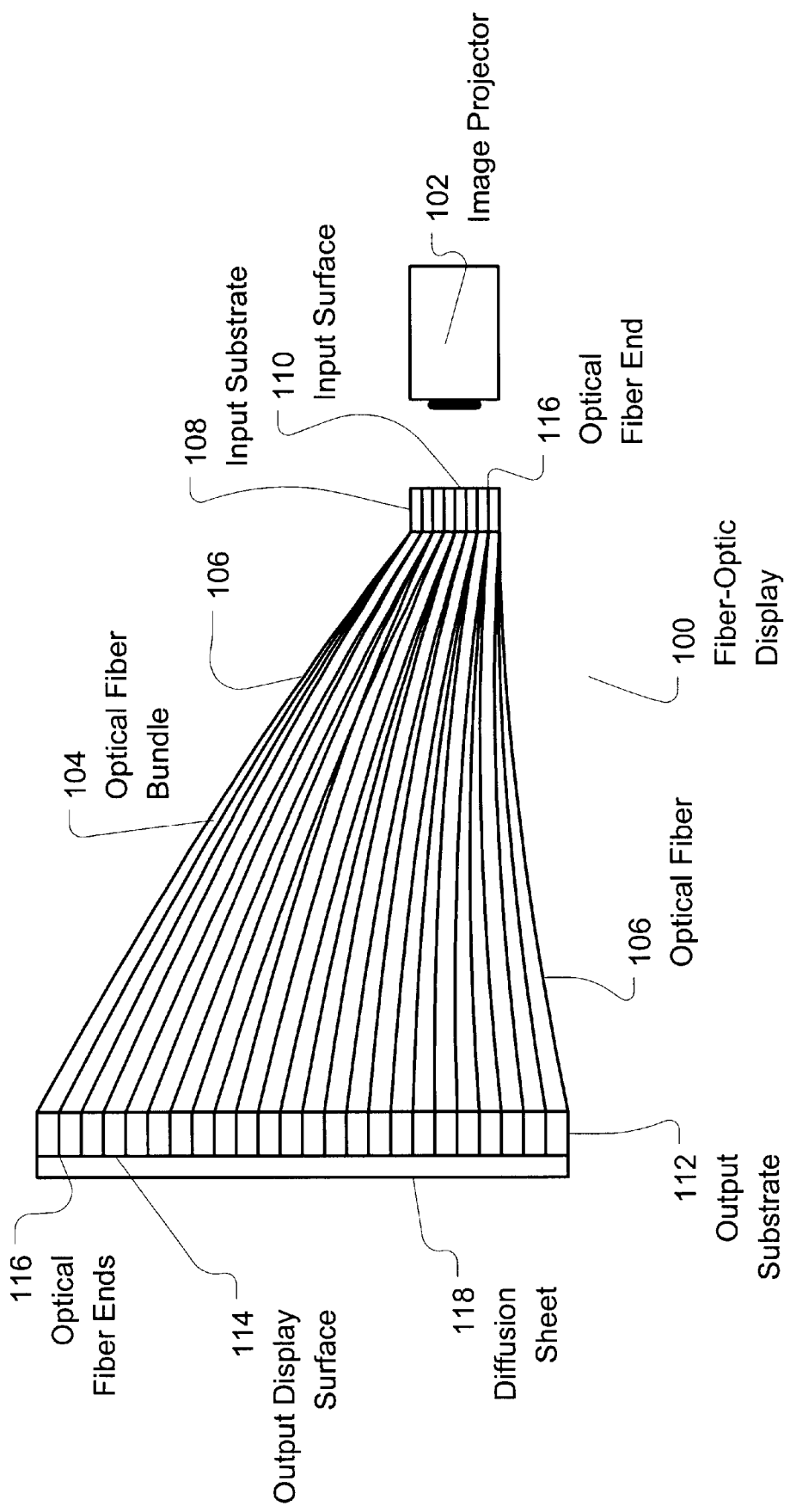
FIG. 2 is a plan view of the fiber-optic display shown in FIG. 1.

An optical fiber (fiber-optic) display 100 incorporating one embodiment of the present invention is presented in FIGS. 1 and 2, which show the four major components of the fiber-optic display 100: an image projector 102; an optical fiber bundle 104; an input surface 110; and an output display surface 114. The image projector 102 projects and image upon the input surface 110. The image projector may be a cathode ray tube device or a liquid crystal display, but can be any one of a number of devices for projecting an image. The light of the image is projected upon the input surface 110 of the fiber-optic display 100 where it enters the optical fibers 106 in the optical fiber bundle 104. Typically, the input surface consists of an input substrate 108 which holds an end 116 of each optical fiber 106 to form a planar surface. The light incident on the ends 116 of the optical fibers 106 is transmitted through the body of the fibers 106 to the output display surface 114, where the light is emitted from the other end 116 of the optical fibers 106. The output display surface 114 likewise consists of optical fibers 106 held by an output display substrate 112 so that the ends 116 of the optical fibers 106 are located in relationship to the outer surface 114 of the output substrate 112. The ends 116 of the optical fibers 106 are positioned in the same relative location on the input surface 110 and the output display surface 114 so that the light emitted from the optical fibers 106 at the output display surface 114 effectively recreates the image that is projected upon the input surface 110.

Figure 4:
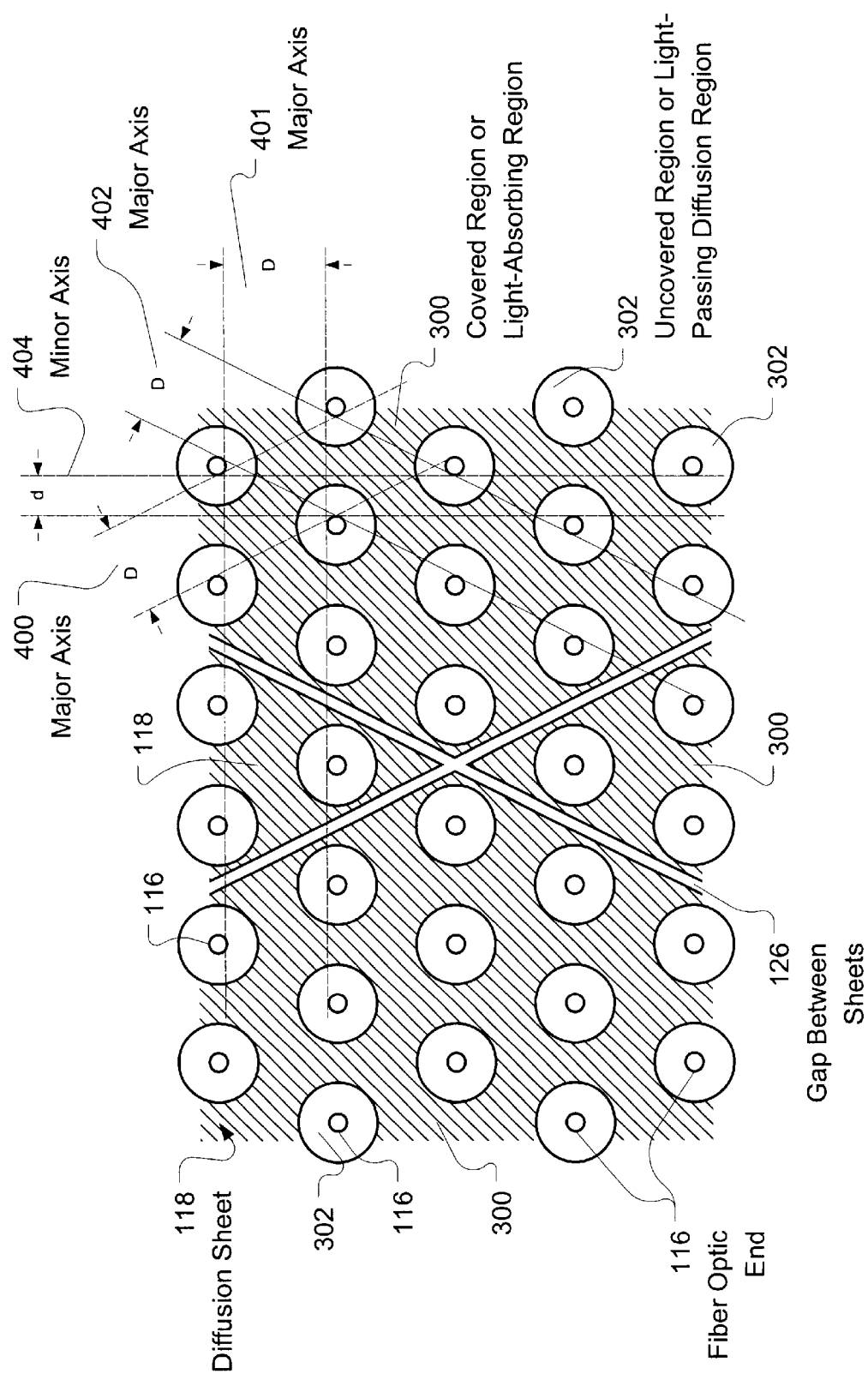
FIG. 4 is a detailed view of the output surface in accordance with a preferred embodiment of the present invention.

An embodiment of the invention is shown in FIG. 4, which discloses the covered, or light-absorbing, regions 300 and the uncovered, or light-passing, diffusion regions 302 of the diffusion sheets 118. The covered regions are created by covering a surface of the diffusion sheets 118 with a light-absorbing material, such as black paint. The light-absorbing material can be applied in any desired fashion including lithography. In a preferred embodiment, each fiber-optic end 116 at the output surface 114 is aligned with an uncovered region 302 of a diffusion sheet 118 where the uncovered or light-passing diffusion region 302 is approximately two to fifteen times the cross-sectional area of an optical fiber 106. This range has been determined to provide the optimum balance between the competing objectives of providing the proper alignment during application of the diffusion sheets 118, obtaining sufficient increase in viewing angle and reducing reflected glare from the substrate 112.

As shown in FIG. 4, the remaining surface area of the substrate 112 is covered by the light-absorbing regions 300 of the diffusion sheets 118. The covered regions 300 absorb incoming light before it enters the diffusion layer. This reduces glare from the substrate surface and improves the quality of the output image. In a preferred embodiment, the covered regions 300 are created by a surface coating on the diffusion sheets 118. However, other methods are possible such as having the light-absorbing region within or part of the diffusion sheets 118. In FIG. 5, the preferred embodiment is shown where the diffusion sheets 118 are applied to the output display surface 114 with the light-absorbing material which creates the covered regions 300 on the surface opposite the substrate 112. An alternate embodiment is shown in FIG. 6 where the light-absorbing material creating the covered regions 300 is on the surfaces of the diffusion sheets 118 that contact the substrate 112.

Figure 3:
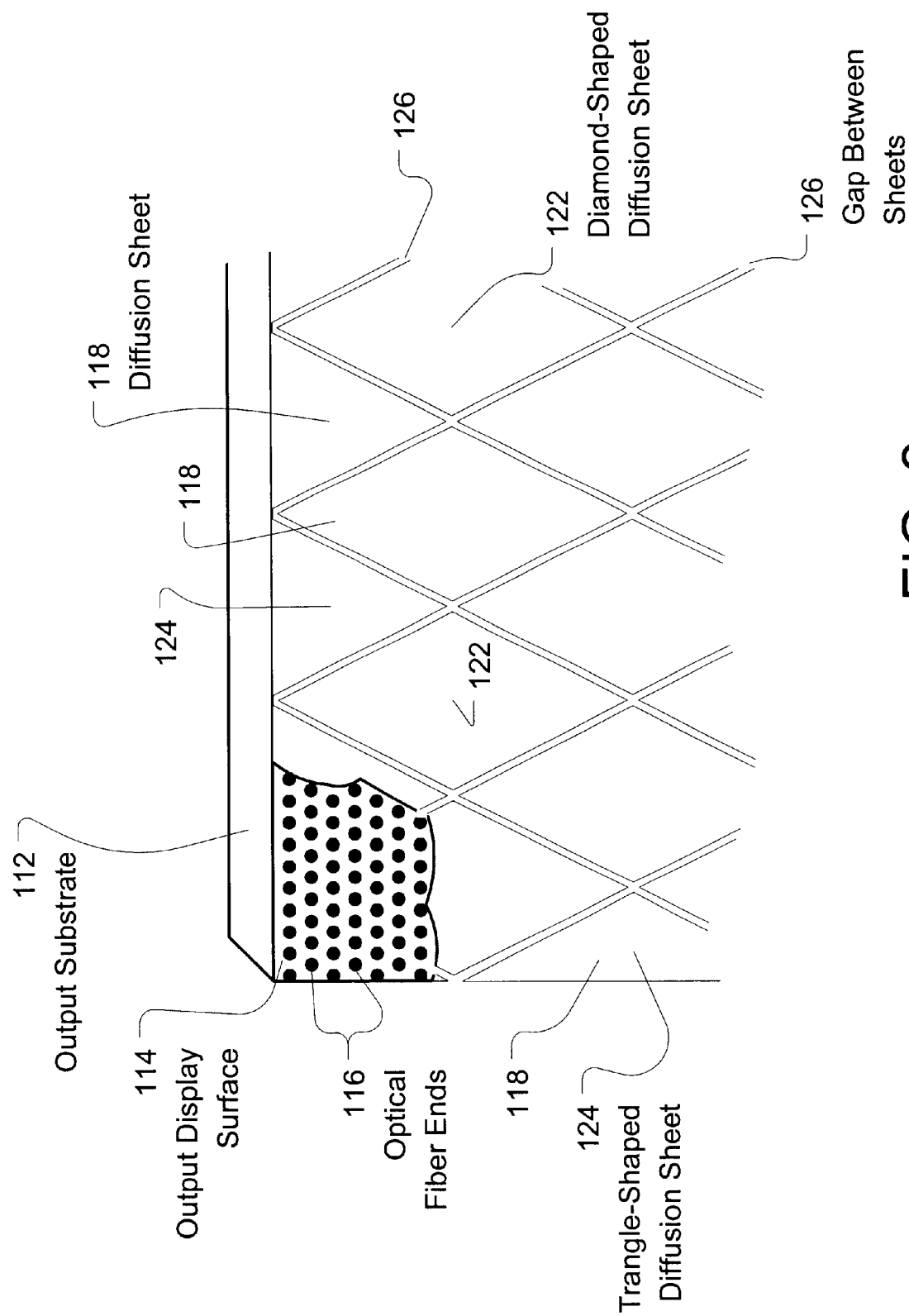
FIG. 3 is a detailed view of the output surface of the fiber optic bundle in accordance with a preferred embodiment of the present invention.

As shown in FIG. 3, the output display surface 114 is covered with multiple diffusion sheets 118, shown partially cut away to reveal the ends 116 of the optical fibers 106 in accordance with one embodiment of the present invention. The fiber-optic ends 116 on the output display surface 114 are shown in a typical arrangement where the ends 116 are positioned in offset rows creating a generally honeycomb-like pattern where each optical fiber end 116 is roughly equidistant from its nearest six neighbors.

As shown in FIG. 4, this arrangement creates three major axes 400, 401, and 402 between the optical fiber ends 116 at 60 degrees to each other in which the optical fiber ends 116 are separated by roughly the same distance D, and one minor axis 402 at 90 degrees to one of the major axes 401 in which the optical fiber ends 116 are separated by a much smaller distance d. An embodiment of the present invention takes advantage of this typical arrangement by using diffusion sheets 118 that are shaped as diamonds 122 and triangles 124 so that the edges of the diffusion sheets 118 can be aligned with the major axes 400, 401, and 402 between the fiber-optic ends 116 when the sheets 118 are applied to the output substrate 112 as shown in FIG. 4. The diffusion sheets 118 are arranged on the substrate 112 completely covering each fiber-optic end 116 and with a gap 126 between each adjacent sheet 118 so that the sheets 118 do not overlap.

The diamond- and triangle-shaped diffusion sheets 118 shown in FIGS. 3 and 4 have an advantage over typical rectangular sheets (not shown) in that there can be a larger gap 126 between adjacent sheets 118 utilizing the diamond and triangle shapes than between sheets shaped as rectangles, which increases the margin for error in the application of diffusion sheets 118 onto the output display surface 114. A further advantage of this configuration is that diamond- and triangle-shaped sheets 118 are easier to apply to the substrate 112 without creases and without trapping air between the sheet 118 and the surface 114 in comparison to rectangular sheets of the same surface area. In an embodiment of the present invention, the substrate 112 exposed by the gap 126 is subsequently treated to roughen the substrate's 112 surface and reduce glare from the exposed surface. This effectively hides the gaps 126 and reduces the visibility of the joints between the sheets 118.

Figure 7:
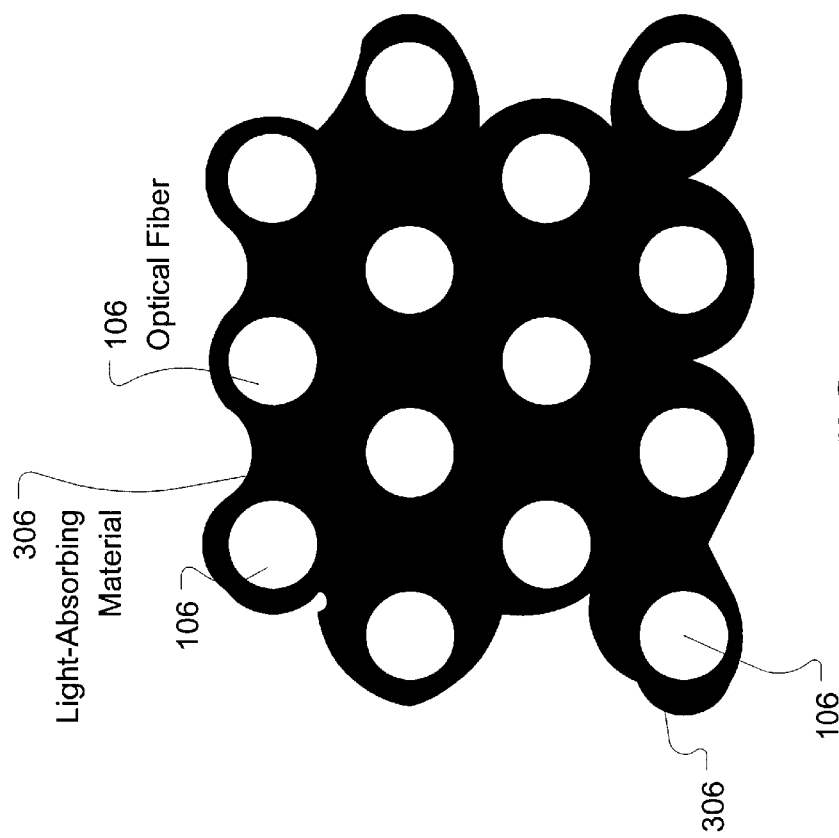
FIG. 7 is a cross-sectional view of optical fibers within an optical fiber bundle showing light-absorbing adhesive coating the fibers in accordance with a preferred embodiment of the present invention.

Another embodiment of the invention is shown in FIG. 7 which enhances the performance of the optical fiber bundle 104 by the application of a light-absorbing adhesive 306 to the exposed portion of the optical fibers 106 between the substrates 110, 114. The adhesive 306 absorbs any light that escapes from the optical fibers 106 before the escaped light can contact another fiber 106. The adhesive 306 thus prevents crosstalk interference between fibers 106 and improves the final quality of the transmitted image. The preferred embodiment uses a black-colored adhesive 306 to absorb light.

Figure 8:
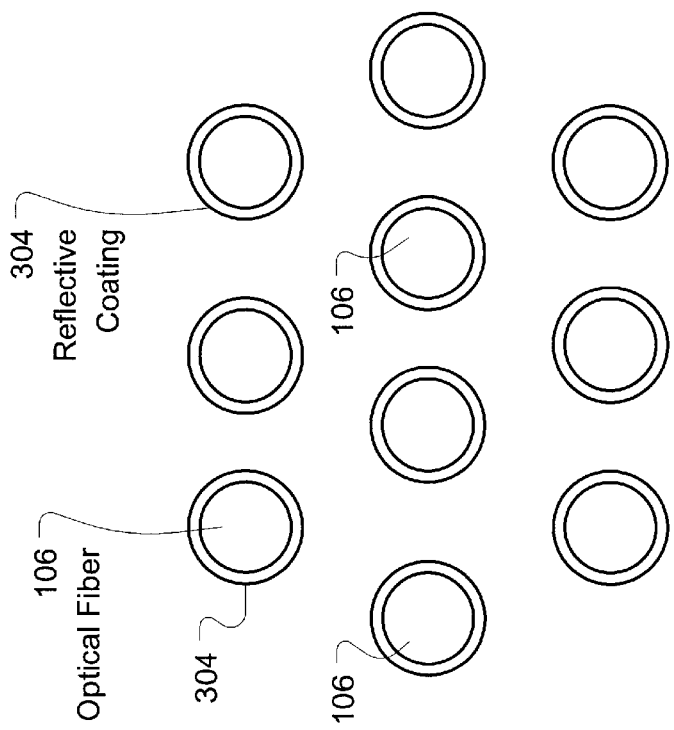
FIG. 8 is a cross-sectional view of optical fibers within an optical fiber bundle showing a reflective coating on the fibers in accordance with another preferred embodiment of the present invention.

FIG. 8 shows another embodiment of the invention that improves the performance of the optical fiber bundle 104 by coating the exposed portion of the optical fibers 116 between the substrates 110, 114 with a reflective material 304. The material 304 reflects any light that escapes the optical fiber 106 back into the fiber 106. This embodiment reduces the loss of light from individual fibers 106, which improves the brightness of the image at the output surface 114 in addition to having the same advantages as the light-absorbing adhesive 306 described above.

In another embodiment, the input and output substrates 108, 112 (shown in FIG. 2) of the optical fiber bundle 104 hold each optical fiber 106 perpendicular to the input and output surfaces 110, 114, respectively, and parallel to the other fibers 106. This is illustrated in FIGS. 5 and 6 for the output substrate 112. It has been determined that bends in the optical fibers 106 near the ends 116 can increase transmission losses and otherwise distort the wavelength of the transmitted light. Thus, holding the optical fibers 106 parallel increases the quality of the displayed image. It has also been determined that, to optimize the quality of the transmitted image, the optical fibers 106 should be held parallel for a distance equal to or greater than approximately 100 times the diameter of the optical fiber 106.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the diffusion sheets may also be shaped as hexagons, trapezoids and triangles and still take advantage of the three major axes formed by the honeycomb arrangement of the optical fiber ends. In addition, the diffusion sheets of the invention are not limited to uses in fiber-optic displays, but are appropriate for use with any surface with one or more light-emitting areas and a substrate area, such as a light emitting diode display. Numerous other changes may be made which will readily suggest themselves to those skilled in the art and which are encompassed in the spirit of the invention disclosed and as defined in the appended claims.

What is claimed is:

1. A method of reducing the amount of light reflected from a display surface having light emitting areas and a substrate area, comprising the steps of:

applying a light-absorbing material to said display surface to cover only said substrate area by covering an area of a surface of a transparent sheet with said light-absorbing material;

applying said transparent sheet to said display surface aligned such that said light-absorbing material covers only said substrate area and such that said light-absorbing material is between said transparent sheet and said display surface.

2. A device for reducing the amount of light reflected from a display surface having light emitting areas and a substrate area, said device comprising:

a light-absorbing material applied to said substrate area of said display surface wherein said light-absorbing material comprises said light-absorbing material applied to a transparent sheet applied to said display surface such that said light-absorbing material covers said substrate area but does not cover said light-emitting areas and wherein said transparent sheet is applied to said display surface such that said light-absorbing material is between said display surface and said transparent sheet.

3. A device for reducing the amount of light reflected from a display surface having light emitting areas and a substrate area, said device comprising:

a light-absorbing material applied to said substrate area of said display surface wherein said light-absorbing material covers only that portion of said substrate area of said display surface that is more than a specified distance away from said light emitting areas of said display surface, and said specified distance is such that said light-absorbing material does not cover an area two to fifteen times said light emitting area.

4. A method of reducing non-uniformities in the application of a plurality of sheets of a material to a display surface having a plurality of light emitting areas located within a substrate area, comprising the steps of:

determining sizes and shapes for said sheets, based upon the locations of said light emitting areas, that when placed on said display surface said sheets will completely cover said light emitting areas without overlap;

applying said sheets of said size and shape to said display surface such that said light emitting areas are completely covered by said sheets.

5. A device for displaying images comprising:

a display surface having a plurality of light emitting areas located within a substrate area;

a plurality of transparent sheets applied to the surface of said display device where said transparent sheets are of sizes and shapes such that said light emitting areas are completely covered by said sheets but said sheets do not overlap.

6. The device of claim 5 wherein said shapes of said transparent sheets are interlocking diamond and triangle shapes.

7. The device of claim 5 wherein said shapes of said transparent sheets are interlocking hexagonal, trapezoidal and triangle shapes.

8. The device of claim 5 wherein said transparent sheets are sheets of a material which diffuses light that passes through the material.

9. The device of claim 5 wherein said transparent sheets have a light-absorbing material covering an area on the sheets such that when applied to said display surface said light emitting areas are not covered by said light-absorbing material.

10. The device of claim 5 wherein said transparent sheets are applied to said surface of said display such that said sheets completely cover said light emitting areas, do not overlap, and there is a gap between said sheets.

11. The device of claim 5 wherein said display surface is an output surface of a fiber optic display wherein said light emitting areas are ends of optical fibers and said substrate area is a substrate which hold the optical fibers in place.

12. A method for reducing the visibility of joints between a plurality of transparent sheets placed upon a display surface, comprising the steps of:

applying said plurality of transparent sheets to said display surface so that said transparent sheets do not overlap and so that there is a slight gap between said transparent sheets where a portion of said display surface remains exposed;

treating said exposed portion of said display surface so as to reduce the reflected light from said portion.

13. The method in claim 12 wherein the step of treating the said exposed portion involves applying a chemical that reacts with said exposed portion to roughen its surface.

14. A device for displaying images comprising:

a display surface;

a plurality of transparent sheets applied to the display surface such that said sheets do not overlap;

small gaps between said sheets exposing a portion of said display surface;

where said exposed portion is roughened to reduce the visibility of reflected light.

15. The device of claim 14 wherein said display surface is an output surface of an optical fiber display.

16. The device of claim 14 wherein said transparent sheets are diffusion sheets.

17. A device for increasing the performance of an optical fiber bundle containing a plurality of optical fibers comprising:

said bundle of said plurality of optical fibers;

each optical fiber having two ends connected by a cylindrical fiber with a measured diameter;

a substrate holding one of said ends of said plurality of uniform optical fibers straight and parallel with other said fibers in said substrate such that said ends are perpendicular to said cylindrical fiber for a distance based on said measured diameter of said optical fibers, wherein each of the said substrates consists of two separate substrates each holding one of said ends of said plurality of uniform optical fibers straight and parallel with other said fibers in said substrate such that said ends are perpendicular to said cylindrical fiber for a distance based on said measured diameter of said optical fibers.

18. A device for increasing the performance of an optical fiber bundle containing a plurality of optical fibers comprising:

said bundle of said plurality of optical fibers each optical fiber having two ends connected by a cylindrical fiber with a measured diameter;

a substrate holding one of said ends of said plurality of uniform optical fibers straight and parallel with other said fibers in said substrate such that said ends are perpendicular to said cylindrical fiber for a distance based on said measured diameter of said optical fibers, wherein said distance is greater than approximately 100 times the diameter of one of the said plurality of optical fibers.

* * * * *